May 11, 1926.
N. ROE
1,584,146
WAVE MOTOR
Filed Dec. 30, 1922    2 Sheets-Sheet 1
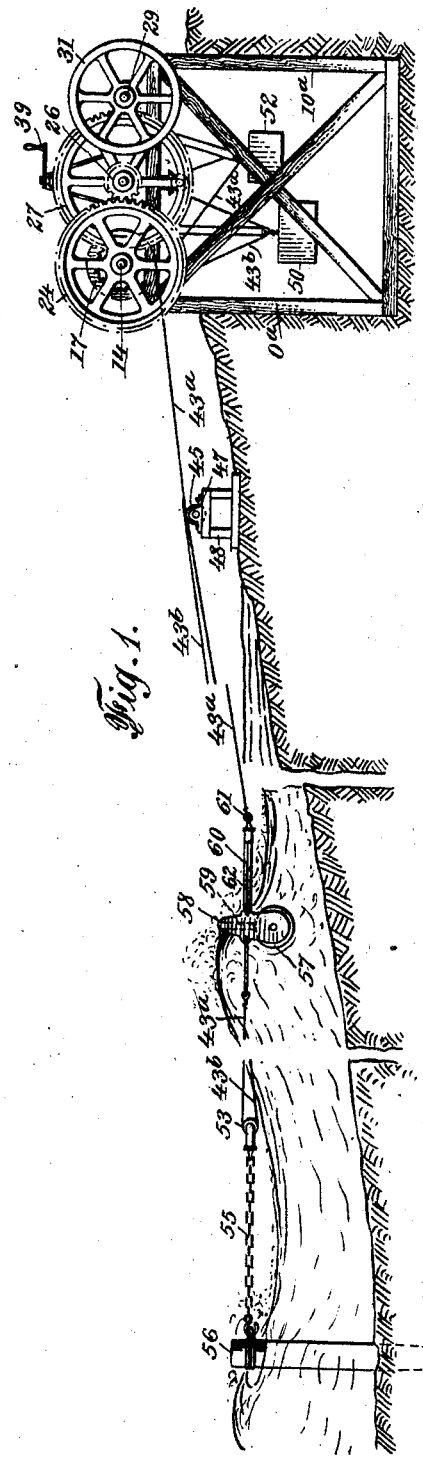
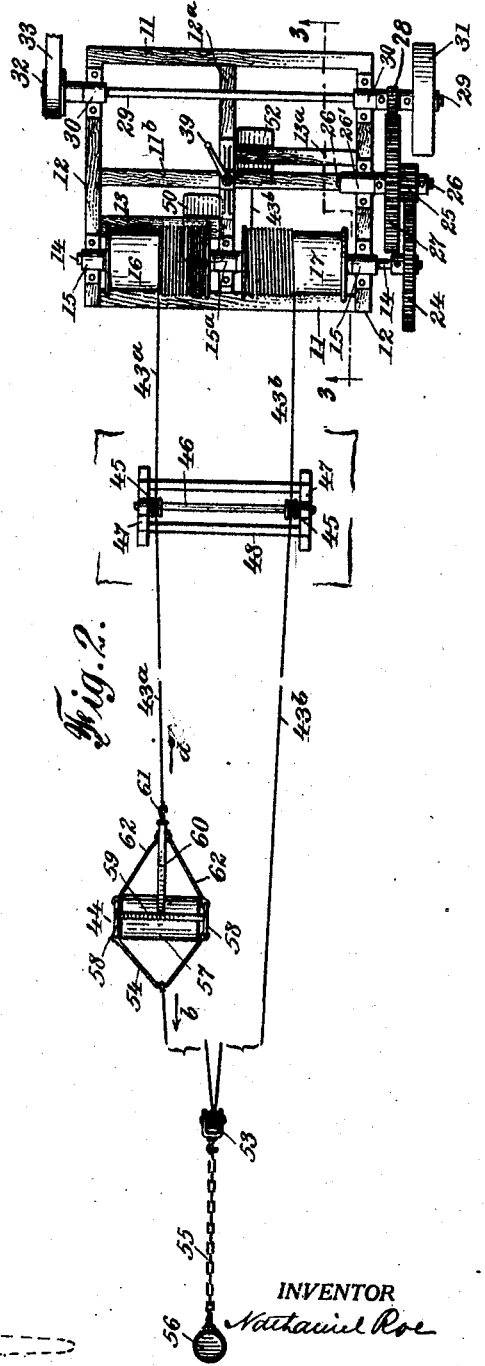
INVENTOR
Nathaniel Roe
BY Conrad A. Dietrich
his ATTORNEY May 11, 1926.

N. ROE

WAVE MOTOR

Filed Dec. 30, 1922

INVENTOR
Nathaniel Roe
BY Conrad A. Dittrich
his ATTORNEY

Patented May 11, 1926.

1,584,146

UNITED STATES PATENT OFFICE.

NATHANIEL ROE, OF PATCHOGUE, NEW YORK.

WAVE MOTOR.

Application filed December 30, 1922. Serial No. 609,804.

My invention relates to improvements in means for utilizing the power of the waves, and the same has for its object more particularly to provide a simple, efficient and comparatively inexpensive apparatus for converting the power of the waves into a uniform rotary motion in order to render the same available for operating machinery of various kinds and for various purposes.

Further, said invention has for its object to provide an apparatus whereby the power of the waves exerted in substantially a horizontal plane may be utilized and converted in substantially constant uniform rotary motion.

Further, said invention has for its object to provide an apparatus whereby the wave power, that is to say, the "break" and "undertow" may be acquired and converted into substantially uniform rotary movement which may be employed for the operation of divers forms of machinery or mechanism.

Further, said invention has for its object to provide an apparatus in which the actuating part or member is reciprocated in substantially a horizontal plane by the "break" and "undertow", and translated into a uniform rotary motion, which, in turn, may be employed for the operation of various forms of machinery or apparatus.

Other objects will in part be obvious, and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings forming part of this specification—

Figure 1 is a side elevation partly broken showing one form of apparatus constructed according to, and embodying my said invention;

Fig. 2 is a plan or top view of the mechanism illustrated at Fig. 1;

Figure 3:
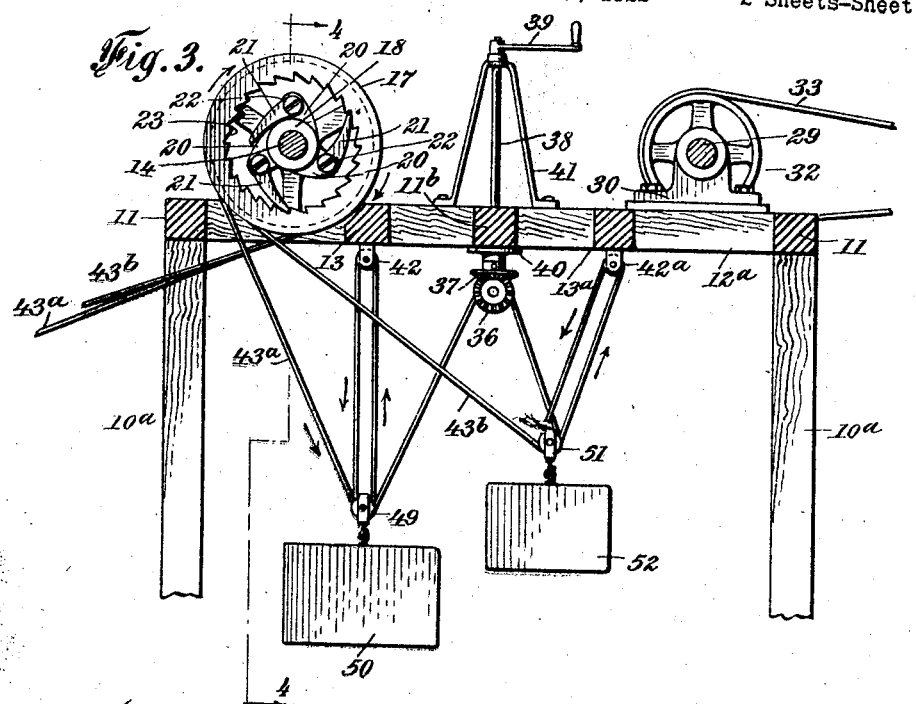
Fig. 3 is an enlarged transverse section of the intermediate or power receiving and transmitting mechanism on the line 3—3 of Fig. 2.
Figure 4:
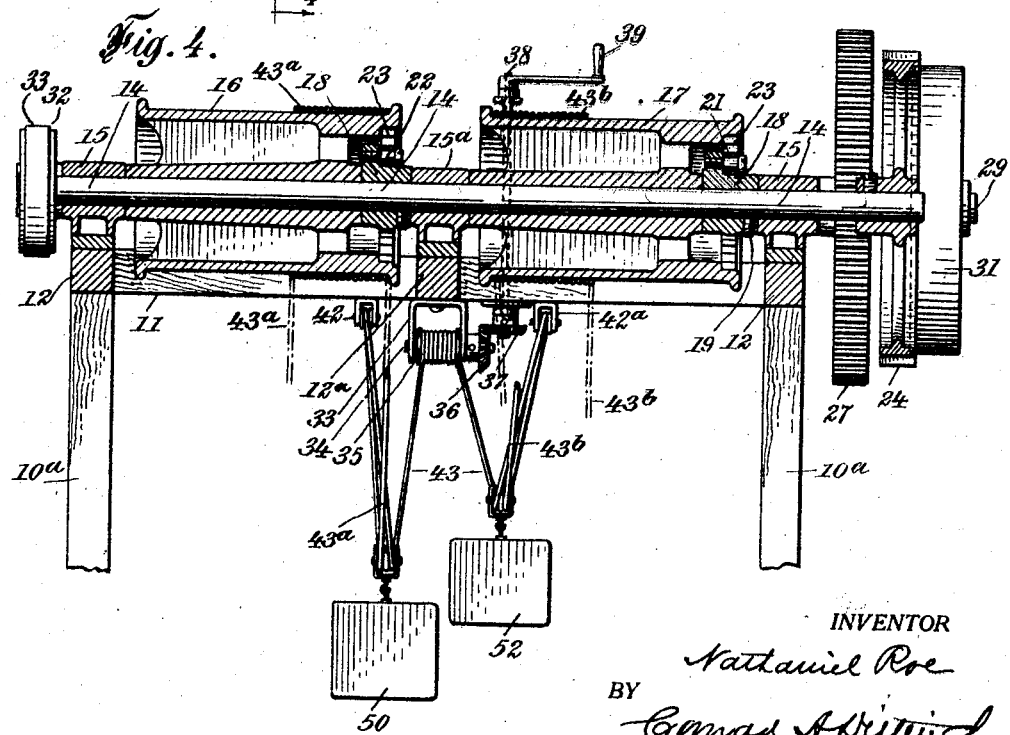
Fig. 4 is an enlarged longitudinal section taken on the line 4—4 of Fig. 3.

In said drawings, 10 designates a platform comprising the standards 10ª upon the upper ends of which are supported the longitudinal members 11, connected together by transverse end members 12, and intermediate transverse member 12ª.

Between the intermediate transverse member 12ª and one of the end members 12, is secured a short longitudinal member 13, and between the intermediate member 12ª and the other transverse member 12, is secured a similar short longitudinal member 13ª.

14 denotes a driving shaft which is supported in end bearings 15, secured upon the transverse frame members 12, and in an intermediate bearing 15ª, which is secured upon the intermediate transverse member 12ª. Upon the shaft 14 are loosely mounted drums 16, 17, and adjacent to one end of each drum is a collar 18 which is fixed upon the shaft 14 by a suitable key or locking member 19.

From the collar 18 extend radial members 20 provided at their outer ends with pawls 21, which are pivotally secured thereto by bolts 22.

One end of each drum 16, 17, adjacent to its collar 18, is provided with an internal ratchet gear 23, the teeth of which are adapted to engage the ends of the pawls 21 when the drums 16, 17, are rotated in a clockwise direction. Upon one end of the shaft 14 is fixed a large gear 24 which meshes with a pinion 25, mounted upon a short shaft 26, supported in a bearing 26′, secured to the transverse frame member 12. Upon the shaft 26 is also fixed a large gear wheel 27 which meshes with a pinion 28 fixed upon the driven shaft 29, supported in bearings 30, secured to the frame members 12. At one end of said driven shaft 29 is fixed a fly wheel 31, and at the other end of said shaft 29 is fixed a pulley 32, over which passes a belt 33 for transmitting power to the machine or apparatus to be operated by the motor.

Directly below the central longitudinal frame member 11ᵇ is secured a hanger 33, in which is supported an adjusting mechanism comprising a shaft 34, having fixed thereon a small drum or pulley 35, and at the outer end of said shaft is fixed a bevel gear 36, which meshes with a bevel gear 37 fixed upon the lower end of a shaft 38 extending upwardly through the platform 10, and provided at its upper end with an operating handle 39.

In order to support the shaft 38 and the parts carried thereby in proper position, the lower end of the same extends through the bearing 40 provided upon the under side of the platform, and its upper end is steadied by a support 41 having its end secured upon the upper side of the platform 10.

Upon the under side of the short longitudinal frame members 11 are secured pulleys 42, 42$^a$. 43 denotes a cable having its ends or parts 43$^a$, 43$^b$ secured to a float 44. The cable part 43$^a$ extends from the float 44 over a guide roller 45 mounted upon the shaft 46, supported in bearings 47 upon the frame 48, and is wound a number of times over the drum 16, and the end thence passed through a pulley 49, secured to a counter weight 50, and upwardly over the pulley 42, downwardly again over the second sheave of pulley 49, and thence upwardly again and wound a number of times over the pulley 35 on the shaft 34. The end of the cable part 43$^b$ is thence carried downwardly over one sheave of a pulley 51 secured to a counterweight 52, and upwardly over the pulley 42$^a$, downwardly again over a second sheave of the pulley 51, and thence forwardly and wound several times around the drum 17. The said part 43$^b$ is then carried outwardly over a guide roller 45 on the frame 48, and passed over a pulley 53, and secured to the bale 54 extending from the opposite side of the float 44. The pulley 53 is secured to one end of a chain 55, whose other end is fixed to a pile or other rigid support 56 secured in the ground.

The float 44 consists essentially of a roller 57, preferably made of wood or other buoyant material, which roller is mounted in a frame comprising the end members 58, secured together by a flat transverse web 59, from which extends centrally a shaft or pole 60, having a hook or eye 61 at its outer end, to which the cable part or end 43$^a$ is secured. In order to maintain the pole 60 rigidly secured to the web 59, the same is braced by diagonal members 62 extending from the forward end of pole 60 to the sides of the frame members 58.

The operation of the apparatus is as follows:

The transmitting mechanism comprising the platform 10 and the operating parts carried thereby is set in a well or pit adjacent to the shore which should preferably be of a gradual sloping character. The said well or pit should be located well above the normal high water line. As the waves move towards shore, they will cause the float 40 to be carried inwardly a predetermined distance and as the float reaches shallow water, the roller 57 thereof will ride upon the ground. As the float travels inwardly in the direction of the arrow $a$, Fig. 2, it will cause the cable part 43$^b$ to be unwound from the drum 17, and in being so unwound, cause the drum to rotate in a clockwise direction. As the drum 17 is rotated, the ratchet 23 thereof will engage with the lowermost pawl 21 and lock the drum 17 operatively to the shaft 14, and cause the same to rotate therewith. In rotating the drum 17, the cable 43 will cause the weight 52 to be raised by the action of the cable end 43$^b$, and the pulleys 42, 51 until the same has reached a height corresponding to the limit of the predetermined movement or extent of travel of the float 44.

Hereupon, as the undertow passes out, it will carry the float 44 outwardly in direction of the arrow $b$, Fig. 2, and in so doing, cause the cable part 43$^a$ to be partly unwound from the drum 16, and cause the ratchet 23 of the drum 16 to become interlocked with the pawls 21 thereof, and cause the shaft 14 to be rotated in the same direction as said shaft was by the action of the drum 17.

As the cable part 43$^a$ is unwound from the drum 16, the cable part 43$^b$, which is now slack, will be rewound upon the drum 17, which is now free to move in the reverse direction, under the influence of the weight 52. As the weight 52, associated with the drum 17, descends, the weight 50, associated with the drum 16, is raised.

The action just above described will be repeated with each break and undertow of the waves and thereby maintain the drums 16, 17 and shaft 14, constantly in motion and communicating movement to the driven shaft 29 through the minimum of the train of gearing comprising the gears 24, pinion 25, gear 27 and pinion 28, to the driven shaft 29, from which the power may then be transmitted by the pulley 32 and belt 33 to the apparatus or machine to be operated by the motor.

The range of travel of the float 44 may be changed to correspond with the conditions of the shore or adjacent ground, and of the water conditions, by actuating the small drum 35 by means of the handle 39 and interposed parts. By actuating said small drum 35, the cable parts 43$^a$, 43$^b$ may be wound more or less upon one or the other of the drums 16, 17, and in so doing the float 44 will be brought nearer to shore or nearer to the pile or support 56, as the case may be, and thereby shift the field of movement or operation of the float 44 without changing the extent of its travel.

The foregoing description illustrates the principles embodied in my said invention, but it will be understood that various changes or modifications may be resorted to within the scope of the invention.

Having thus described my said invention what I claim and desire to secure by Letters Patent is:

1. An apparatus of the character described comprising a driving shaft, a driven shaft, means connecting said shafts, means operatively associated with said driving shaft for actuating the same, a horizontally-reciprocable floating member, means connecting the opposite ends of said floating member with the said driving shaft actuating means whereby to operate said actuating means by the movements of said floating member, and means for shifting the field of travel of said floating member, substantially as specified.

2. An apparatus of the character described comprising a driving shaft, a driven shaft, means connecting said shafts, revoluble means associated with said driving shaft and adapted to engage therewith to rotate said shaft in one direction, a horizontally-reciprocable floating member, means connecting said floating member with said revoluble means whereby to rotate the latter by the movements of said floating member, and means for shifting the field of travel of said floating member, substantially as specified.

3. An apparatus of the character described comprising a driving shaft, a driven shaft, means connecting said shafts, a plurality of revoluble members loosely mounted upon said driving shaft, clutch means for each of said revoluble members for connecting the same with said driving shaft, a horizontally-reciprocable floating member, flexible means connecting said floating member with each of said revoluble members for actuating said revoluble members by the reciprocations of said floating member, and means for shifting the field of travel of said floating member, substantially as specified.

4. An apparatus of the character described comprising a driving shaft and a driven shaft, a train of gearing between said shafts, a pair of drums loosely mounted upon said driving shaft, a ratchet gear arranged at one end of each of said drums, clutches fixed upon said driving shaft and adapted to engage severally the ratchet wheels on said drums, a reciprocable floating member, a pair of flexible members each secured at one end to said floating member and wound upon said drums whereby to actuate said drums when said floating member is reciprocable horizontally in response to the break and undertow of the waves, substantially as specified.

5. An apparatus of the character described comprising a driving shaft, a driven shaft, means connecting said shafts, a plurality of drums loosely mounted upon said driving shaft, clutch means fixed upon said shaft adjacent to one end of each of said drums, a horizontally-reciprocable floating member, flexible means connected to the opposite ends of said floating member and to said drums whereby to actuate said drums when said floating member is reciprocated, substantially as specified.

6. An apparatus of the character described comprising a driving shaft, a driven shaft, means connecting said shafts, a plurality of drums loosely mounted upon said driving shaft, clutch means fixed upon said shaft adjacent to one end of each of said drums, a horizontally-reciprocable floating member, flexible means connected to the opposite ends of said floating member and to said drums whereby to actuate said drums when said floating member is reciprocated, and means associated with said flexible means for shifting the field of travel of said floating member, substantially as specified.

7. An apparatus of the character described comprising a driving shaft, a driven shaft, a train of gearing between said shafts, a pair of drums loosely mounted upon said driving shaft, a ratchet gear arranged at one end of each of said drums, clutches fixed upon said driving shaft and adapted to engage severally the ratchet wheels on said drums, a horizontally-reciprocable floating member, a flexible connection secured at its ends to said floating member and engaging said drums whereby to actuate said drums when said floating member is reciprocated, substantially as specified.

8. An apparatus of the character described comprising a driving shaft, a driven shaft, a train of gearing between said shafts, a pair of drums loosely mounted upon said driving shaft, a ratchet gear arranged at one end of each of said drums, clutches fixed upon said driving shaft and adapted to engage severally the ratchet wheels on said drums, a horizontally-reciprocable floating member, a flexible connection secured at its ends to said floating member and engaging said drums whereby to actuate said drums when said floating member is reciprocated, and means engaging said flexible member controlling the same to shift the field of travel of said floating member, substantially as specified.

9. An apparatus of the character described comprising a driving shaft, a driven shaft, means connecting said shafts, a plurality of drums loosely mounted upon said driving shaft, clutch means fixed on said driving shaft adjacent to one end of each of said drums, a pair of supports, flexible means movably secured to said supports and operatively engaging said drums, and a horizontally-reciprocable float secured to said flexible means; said float being adapted to actuate said drums by the reciprocation thereof in response to the break and undertow of the waves, substantially as specified.

10. An apparatus of the character described comprising a driving shaft, a driven shaft, means connecting said shafts, a plurality of drums loosely mounted upon said driving shaft, clutch means fixed on said driving shaft adjacent to one end of each of said drums, a pair of supports, flexible means movably secured to said supports and operatively engaging said drums, a horizontally-reciprocable float secured to said flexible means adapted to actuate said drums by the reciprocation thereof in response to the break and undertow of the waves, and means for adjusting said flexible means and float, substantially as specified.

11. An apparatus of the character described comprising a driving shaft, a driven shaft, means connecting said shafts, a plurality of drums loosely mounted upon said driving shaft, clutch means fixed on said driving shaft adjacent to one end of each of said drums, a pair of supports, a cable movably secured to said supports and operatively engaging said drums, a horizontally-reciprocable float secured to said flexible means adapted to actuate said drums by the reciprocation thereof in response to the break and undertow of the waves, and means for adjusting said cable to shift the horizontal field of travel of said float, substantially as specified.

12. An apparatus of the character described comprising a driving shaft, a driven shaft, means connecting said shafts, a plurality of drums loosely mounted upon said driving shaft, clutch means fixed on said driving shaft adjacent to one end of each of said drums, a fixed support, a revoluble support, a cable movably secured to said supports and having its intermediate portions wound upon said drums, a horizontally-reciprocable float secured to said flexible means adapted to actuate said drums by the reciprocation thereof in response to the break and undertow of the waves, and means for maintaining the portions of said cable intermediate said drums and said revoluble support under tension, substantially as specified.

13. An apparatus of the character described comprising a driving shaft, a driven shaft, a train of gearing intermediate said driving and driven shafts, a plurality of drums loosely mounted upon said driving shaft, clutch means fixed on said driving shaft adjacent to one end of each of said drums, a fixed support, an adjusting mechanism comprising a revoluble support and means for actuating the same, a horizontally-reciprocable float, a cable movably disposed upon said fixed and revoluble supports and having its ends secured to said float, and its intermediate portions severely wound upon said drums, and counter-weights disposed upon the portions of said cable intermediate said drums and said revoluble support, substantially as specified.

Signed at the city of New York, in the county and State of New York, this 6th day of November, one thousand nine hundred and twenty-two.

NATHANIEL ROE.